(12) United States Patent
Gorzellik et al.

(10) Patent No.: US 11,277,387 B2
(45) Date of Patent: Mar. 15, 2022

(54) NETWORK WITH PARTLY UNIDIRECTIONAL DATA TRANSMISSION

(71) Applicants: Hirschmann Automation and Control GmbH, Neckartenzlingen (DE); Thales Management and Services Deutschland GmbH, Ditzingen (DE)

(72) Inventors: Dietrich Gorzellik, Neckartenzlingen (DE); Dieter Klippel, Pfullingen (DE); Johannes Schilling, Gomaringen (DE); Rolf-Dieter Sommer, Ostfildern (DE); Hans Kraft, Ilsfeld (DE); Harald Bauer, Backnang (DE)

(73) Assignees: HIRSCHMANN AUTOMATION AND CONTROL GMBH, Neckartenzlingen (DE); THALES MANAGEMENT & SERVICES DEUTSCHLAND GMBH, Ditzingen (DE)

( * ) Notice: Subject to any disclaimer, the term of this patent is extended or adjusted under 35 U.S.C. 154(b) by 0 days.

(21) Appl. No.: 15/777,258

(22) PCT Filed: Dec. 20, 2016

(86) PCT No.: PCT/EP2016/081963
§ 371 (c)(1),
(2) Date: May 18, 2018

(87) PCT Pub. No.: WO2017/108816
PCT Pub. Date: Jun. 29, 2017

(65) Prior Publication Data
US 2018/0351919 A1 Dec. 6, 2018

(51) Int. Cl.
*H04L 29/06* (2006.01)
*H04L 61/106* (2022.01)
(Continued)

(52) U.S. Cl.
CPC ........ *H04L 63/0428* (2013.01); *H04L 61/106* (2013.01); *H04L 61/6022* (2013.01);
(Continued)

(58) Field of Classification Search
CPC . H04L 61/106; H04L 61/6022; H04L 63/105; H04L 63/0227; H04L 63/0428
See application file for complete search history.

(56) References Cited

U.S. PATENT DOCUMENTS

| 7,028,335 B1 * | 4/2006 | Borella | ............ H04L 29/12367 370/389 |
| 8,139,572 B1 | 3/2012 | Distler | |

(Continued)

FOREIGN PATENT DOCUMENTS

| DE | 202012208290 A | 11/2013 |
| DE | 102013218373 A | 3/2015 |

*Primary Examiner* — Anthony D Brown
*Assistant Examiner* — Rodman Alexander Mahmoudi
(74) *Attorney, Agent, or Firm* — Andrew Wilford

(57) ABSTRACT

Method for operating a network (10), wherein the network (10) comprises at least one outer network (12) having at least one network device (14) and at least one inner network (13) having at least one network device (15), wherein additionally a transmission unit (16) is present that blocks a transmission of data from the outer network (12) to the inner network (13) and allows it in the opposite direction (or vice versa), characterised in that the transmission unit (16) permits a transmission of data only from the inner network (13) to the outer network (12) and the at least one network device (15) sends data from the inner network (13) to the transmission unit (16) with a first address, wherein the transmission unit (16) converts this first address into a second address and thereafter the data are transmitted with this second address in the direction of the outer network (12), the (Continued)

second address being a target address for the at least one network device in the outer network (12).

4 Claims, 1 Drawing Sheet

(51) Int. Cl.
*H04L 101/622* (2022.01)
*H04L 61/5038* (2022.01)
*H04L 61/103* (2022.01)

(52) U.S. Cl.
CPC ........ *H04L 63/0227* (2013.01); *H04L 63/105* (2013.01); *H04L 61/103* (2013.01); *H04L 61/2038* (2013.01)

(56) References Cited

U.S. PATENT DOCUMENTS

| | | | |
|---|---|---|---|
| 9,237,027 | B2 | 2/2016 | Ellard |
| 2002/0016826 | A1 | 2/2002 | Johansson |
| 2007/0026892 | A1* | 2/2007 | Neuhaus ............... H04W 88/02 455/558 |
| 2015/0195198 | A1* | 7/2015 | Shin .................... H04L 12/4625 370/392 |
| 2016/0087933 | A1* | 3/2016 | Johnson ................. H04W 4/70 709/245 |
| 2016/0315949 | A1 | 10/2016 | Falk |
| 2017/0230462 | A1* | 8/2017 | Ascheid ............... H04L 63/101 |

\* cited by examiner

NETWORK WITH PARTLY UNIDIRECTIONAL DATA TRANSMISSION

CROSS REFERENCE TO RELATED APPLICATIONS

This application is the US-national stage of PCT application PCT/EP2016/081963 filed 20 Dec. 2016 and claiming the priority of German patent application 102016016609.3 itself filed 22 Dec. 2015.

FIELD OF THE INVENTION

The invention relates to a method of operating a network and to a system for carrying out such a method where the network has at least one external network with at least one respective external network device and at least one internal network with at least one respective internal network device, and a transmitter that blocks transmission of data from the external network to the internal network or allows it in the opposite direction (or vice versa).

BACKGROUND OF THE INVENTION

It is known, in principle, that network devices are connected to one another in networks and exchange data with one another.

There are also networks divided into at least two networks separated from one another, and data are not only exchanged between network devices inside a respective network, but data are also transmitted from network devices in one network to network devices in the other network, and vice versa.

As long as the at least two networks (network segments) are equivalent, there are no reservations about transmitting the data from one network to the at least one other network and vice versa. However, there are applications during operation of networks in which data can be transmitted from one network to the further network, but not the other way round. In this respect, reference is made to the introductory part of the description in DE 10 2012 208 290, for example.

So-called data diodes are used to prevent data from being able to be transmitted from one network to the further network.

Methods for operating such networks and corresponding systems are known, for example, from DE 10 2013 218 373 or DE 10 2013 226 171 [US 2016/0315949].

In DE 10 2013 218 373, the following method steps are carried out in order to exchange data between a first security zone (first network) and a second security zone (further network):

receiving data from the first security zone at an input stage of a gateway (transmitter), carrying out a process that comprises different required tests of the data, and ensuring execution of each of the required tests by a cryptographic protective measure by virtue of cryptographic protective measures being used to ensure that an output stage of the gateway does not provide the data or data derived from the data in a readable manner for the second security zone if at least one of the required tests has not been carried out.

Such a method is disadvantageous, on the one hand, in that the time for transmitting the data between the first zone and the second zone is delayed on account of the cryptographic protective measures. These delays are unacceptable in practice. On the other hand, data are nevertheless allowed to be transmitted from one zone to the other even though this is not desired for reasons of security. In this known method, there is therefore the risk of the data, which have indeed been transmitted but are cryptographically encrypted, nevertheless arriving in the other zone even though they are not supposed to get there. If they have arrived, there is also the risk of them being rendered readable again on account of corresponding decryption measures. This is an unacceptable security risk.

DE 10 2013 226 171 relates to a method and a system for transmitting data from a transmitter in a first communication network to a receiver in a second, security-critical communication network, and with an input buffer unit, an output buffer unit, a waiting unit and a testing unit. The input buffer unit is designed to provide the data to be transmitted. The waiting unit is designed to capture an input time of the data to be transmitted and to determine a residence time on the basis of information relating to the data to be transmitted and to store the data to be transmitted and/or a control value of the data to be transmitted. The testing unit is designed to test the data to be transmitted after expiry of the residence time using a test pattern that is current after expiry of the residence time, and the output buffer unit is designed to provide the data for the receiver when the data have been considered to be harmless during the check. This signal processing chain results in a disadvantageous increase in the time needed to transmit the data from one network to the further network. This increase in the transmission time is also no longer acceptable when using modern networks under security-critical aspects.

OBJECT OF THE INVENTION

Therefore, the object of the invention is to provide a method of operating a network and a system for carrying out such a method, with which the disadvantages described at the outset are avoided. In particular, the intent is to ensure that it is possible to transmit data from one network to the other, but not the other way, under security-critical aspects, in which case the transmission of data is not intended to be delayed at the same time and a system for carrying out the method has a simple structure and can be easily managed in practice.

SUMMARY OF THE INVENTION

This object is achieved in a method whereby the transmitter allows data to be transmitted only from the internal network to the external network and wherein the at least one internal network device transmits data from the internal network with a first address to the transmitter, the transmitter converts this first address into a second address, and the data are then transmitted with this second address to the external network, the second address being a destination address for the at least one external network device in the external network. This initially advantageously ensures that data transmission is purely physically possible only in one direction. Transmission in the opposite direction is therefore effectively prevented. However, it is therefore also not possible for the internal network, in particular its internal network device, to know the destination address to which it is intended to send its data to the external network, in particular to a external network device present there. For this purpose, the data that the internal network device in the internal network wishes to transmit are linked to a second address inside the transmitter, with the result that the data from the internal network device in the internal network can be sent to the destination address in the external network by the transmitter. For this purpose, provision is made for the transmitter to convert the first address of the network device from the internal network into a second address, and this second address is the destination address for at least one network device, but possibly also a plurality of network devices, in the external network.

It is conceivable for the network device in the internal network to assign a fixed first address to the data to be transmitted. This first address is then assigned to the second address (the destination address), which may also be fixed or variable, in the transmitter.

In order to achieve greater flexibility when carrying out the method according to the invention, one development of the invention provides for the at least one network device in the internal network to transmit a request for data to be transmitted to the transmitter, and for the transmitter to then transmit the first address to the network device. There is therefore no need to assign a fixed address to which the data should be transmitted to the at least one network device, but rather the address to which the data are intended to be transmitted can be predefined by the transmitter. In the event of changes, this has the advantage, in particular, that not every network device has to be newly configured or reconfigured, but rather such a change or a new set-up of the configuration has to be carried out only inside the transmitter. After the request from the at least one network device from the internal network has been done by the transmitter such that the transmitter has transmitted an address to the at least one network device, the at least one network device from the internal network can transmit data with this address to the transmitter. After this has been carried out, the transmitter converts this first address into a second address, as already described, and the data are then transmitted with this second address to the external network. When the second address is a destination address already known in the transmitter, the data can be transmitted directly in this manner.

In order to further increase the flexibility when carrying out the method, the invention also provides for the at least one network device in the external network to transmit its address to the transmitter. This can also be carried out by virtue of the at least one network device in the external network transmitting a request for data to be received to the transmitter and the transmitter then using this second address to forward the data that have been received with the first address to the requesting destination network device. For this purpose, as also already described, the first address is then converted into the second address and therefore the destination address. This procedure has the advantage that the transmitter can predefine the first address on the side of the internal network and receives or alternatively retrieves the destination addresses, which are in particular permanently configured, on the side of the external network.

The invention also provides a system for carrying out the method according to the invention, wherein the invention provides for the transmitter to be set up such that the data with the first address from the internal network are received by a first router of the transmitter and data with the second address are transmitted to the external network by a second router of the transmitter, and data are transmitted between the routers only in one direction, and for the transmitter to also be set up to convert the first address into the second address. Such a transmitter has the important advantage that it can be interposed as a unit between the two networks (internal network and external network) and, with it, no changes whatsoever to the hardware or to the configuration both of the internal network and of the external network are required as a result of the hardware (data transmission in only one direction, for example in the form of a data diode) and the configuration. This means that the internal and external networks can be configured and operated in a conventional manner. In principle, there is initially bidirectional data exchange between the internal network and the external network in the case of such a configuration. However, if it is intended to be ensured that the data can be transmitted only from the internal network to the external network, the transmitter is connected between the two networks, with the result that it is ensured, on account of its configuration and physical implementation, that only data can be transmitted from the internal network to the external network (but not the other way round). If there are changes in the configuration in the internal and/or external network, the configuration of the transmitter can be accordingly adapted. However, it is of major significance that configurations of the transmitter can also be changed without the need to change the configuration of the internal and/or external network.

In order to implement such a system, one development of the invention provides for the two routers to be integrated in one device. These two routers are suitably connected to one another for the purpose of unidirectional data transmission, for which corresponding means are provided. These means may be in the form of a cable, a conductor track or the like, for example, and may have a line driver over their course, with which the data are transmitted in only one direction. It is very particularly advantageous if the transmitter is in the form of an independent device in which the two routers are integrated, and data can be transmitted only in one direction between these two routers. This unidirectional data transmission ensures that, although data can be transmitted from the internal (security-critical) network to the external (non-security-critical) network, they cannot be transmitted the other way round. In addition, this transmitter can be universally used as a connection device between the two networks and known networks that use conventional transmission protocols, in particular standard protocols such as UDP (User Datagram Protocol), for example, can be readily used, in particular. It may, but need not, be the case that particular protocols (for example FTP (File Transfer Protocol)) cannot be used.

BRIEF DESCRIPTION OF THE DRAWING

The method described above is described and explained in more detail below with reference to an embodiment of a system for carrying out this method and shown in a drawing in which.

SPECIFIC DESCRIPTION OF THE INVENTION

Figure 1:
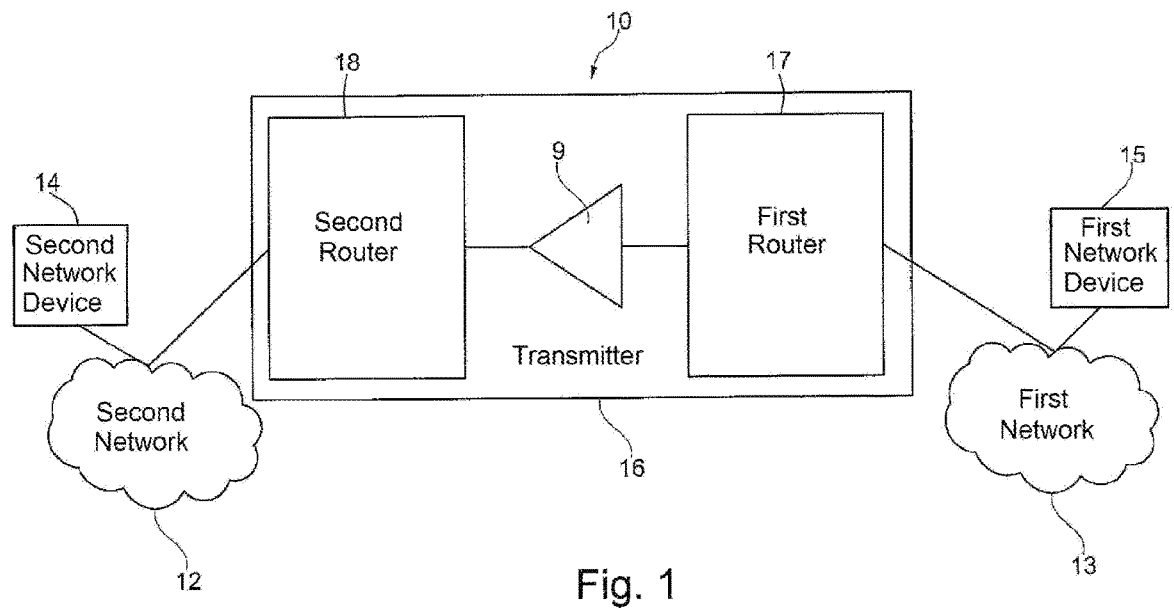
FIG. 1 is a schematic diagram illustrating the invention.

FIG. 1 shows the basic structure of a network 10 in which at least one external (non-security-critical) network 12 is schematically illustrated and in which at least one internal (security-critical) network 13 is also schematically illustrated. At least one external network device 14 (for example a data logger) is symbolically illustrated for the external network 12 and at least one internal network device 15 (for example a data source) is symbolically illustrated for the internal network 13.

The two networks 12 and 13 (and possibly further networks and network devices) are connected to a transmitter 16. This transmitter 16 has a first router 17 and a second router 18, and, in this embodiment, the external network 12 is connected to the router 18 and the internal network 13 is connected to the router 17 by appropriate cabling and interfaces. The two routers 17 and 18 are connected to one another for the purpose of transmitting data in only one direction, and the unidirectional data transmission is symbolically illustrated by a data diode 9.

The method according to the invention is explained again in more detail below on the basis of the hardware shown in FIG. 1 using exemplary values on the basis of FIG. 2.

In two steps (1 and 2), the internal network device 15 transmits a first request (step 1) to the transmitter 16, whereupon the transmitter 16 transmits the first address to the internal network device 15 (step 2). The internal network device 15 therefore "learns" the address (for example a MAC address) to which it is intended to transmit the data for the at least one network device in the external network. However, this first address is not yet the actual destination address of the external network device 14 in the external network 12, but rather this first address (MAC address) is defined by the transmitter 16 and is independent of the address (in particular the MAC address) of the external network device 14. On the one hand, it is therefore not possible to draw any conclusions whatsoever with regard to the actual addresses of the network devices in the internal and external networks. On the other hand, the destination address of the external network device 14 in the external network 12 may not be known in the internal network since communication from the external network 12 to the internal network 13 is not possible via the transmitter 16 on account of the unidirectional data transmission by the data diode 19.

These two steps mentioned above ensure that the network therefore learns which path the data are intended to take from the data source (internal network device 15) to the transmitter 16.

If this has taken place, the data are directly transmitted from the data source 15 to the input of the transmitter 16 in a further step 3. In this case, it is advantageous that the data are directly transmitted and are therefore not flooded. This considerably increases the overall performance of the network 10.

After this operation, the address, namely the router 18, through which the data from the internal network device 15 are intended to be transmitted is known in one unit of the transmitter 16, namely the router 17. This can be carried out in a further step 4.

In two further steps (5 and 6), a request from the transmitter 16 to the external network device 14 informs the latter that data are intended to be transmitted by the transmitter 16 and are therefore intended to be received by the external network device 14. The external network device 14 then informs the transmitter 16 of its address, namely the second address (in step 6), with the result that the second unit in the transmitter 16, the router 18, now also knows the destination address in the external network 12. After the address with which the data have hitherto been transmitted has been converted in the router 18 into the now specific destination address (second address), the data can be transmitted from the output of the transmitter 16 to the at least one external network device 14 in the external network 12 (generally to a data logger) in a further step 7. In this case too, the transmission is carried out in a targeted manner on account of the addresses used, with the result that data flooding also does not take place.

Taking into account the exemplary addresses entered in FIG. 2, the method is again explained briefly in another form below on the basis of steps 1 to 7 illustrated in FIG. 2.

Steps 1, 2:

An ARP response (step 2) ensures that the data source (network device) to learn the MAC address to which it is intended to transmit the data for the data sink (for example data logger). This MAC address is defined (predefined) by the transmitter and is independent of the MAC address of the data sink. This is carried out because the MAC address of the data sink cannot be present at the input of the transmitter since there is no communication whatsoever from the output to the input of the transmitter. By means of this ARP response 2, the network therefore learns which path the data are intended to take from the data source to the input of the transmitter.

Step 3:

Data are transmitted directly from the data source to the input of the transmitter and are not flooded.

Step 4:

The input of the transmitter knows the MAC address to which it is intended to transmit data for the output of the transmitter. This is determined by configuring the two routers in the transmitter.

In order to exchange the destination MAC address, the data are routed to an IP transfer network. This is determined by configuring the two routers in the transmitter. In this step, the data are also transmitted in only one direction. The input of the transmitter can only transmit data to the output of the transmitter since it is not possible to transmit data from the data output to the data input owing to the hardware.

Steps 5, 6:

An ARP response 6 ensures that the output of the transmitter learns the MAC address to which it is ultimately intended to transmit the data for the data sink (for example data logger). This MAC address is defined by the data sink and is independent of the MAC address to which the data source transmits the data. In order to exchange the destination MAC address, the data are routed back to the IP network of the data sink. This is determined by configuring the transmitter, in particular configuring the two routers.

This ARP response 6 thus ensures that the network learns which path the data are intended to take from the output of the transmitter to the data sink.

Step 7:

Data are transmitted directly from the output to the data sink and are not flooded.

All of this has the advantage that data are transmitted directly from the data source to the data sink (and are therefore not flooded in a disadvantageous manner) without the data source knowing the MAC address of the data sink.

Figure 2:
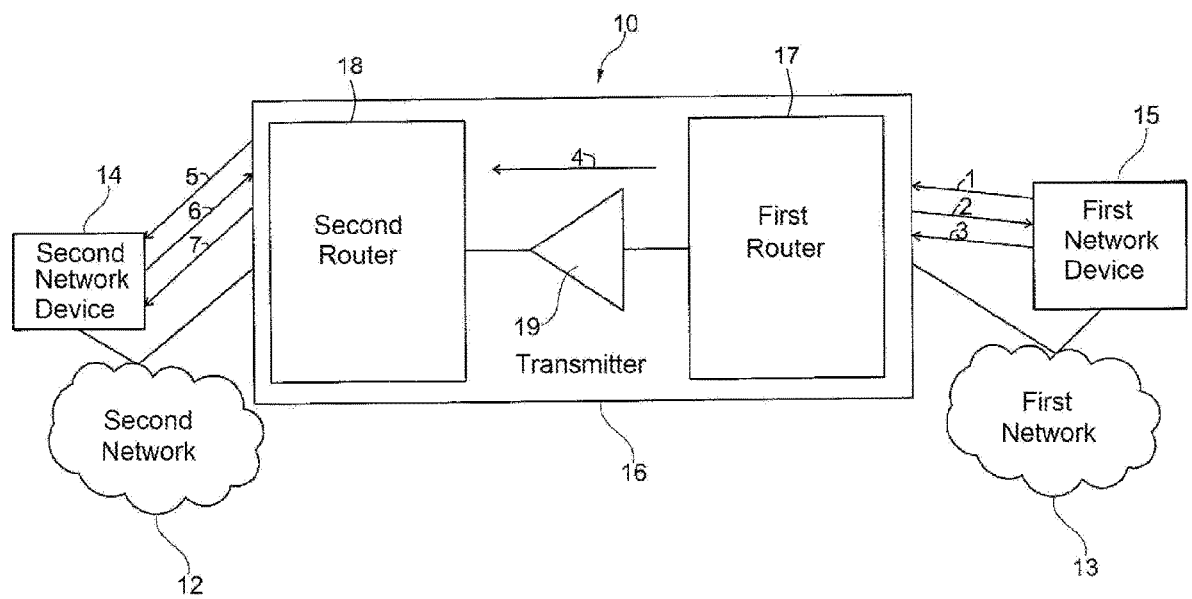
FIG. 2 is another schematic diagram illustrating the invention.

It is pointed out that the designations for the requests and the addresses, as illustrated in FIG. 2, are purely exemplary and are not restrictive. It is also pointed out that it is also conceivable for the external network 12 not to be the non-security-critical network and for the internal network 13 not to be the security-critical network (as previously described), but rather the method can also be operated the other way round. That is to say, the method can also be operated and the corresponding system is designed such that it is possible to transmit data from a non-security-critical network to a security-critical network, but data must not be transmitted from the security-critical network to the non-security-critical network. In addition, the method according to the invention and the corresponding system are not only restricted to the distinction between "security-critical" and "non-security-critical," but can also be generally applied to networks in which data transmission is intended to be possible from one network to the further network, but conversely the data transmission from the further network to the one network is intended to be prevented. This means that networks connected to one another need not necessarily be distinguished by a significance (security-critical/non-security-critical), but that these networks are also equivalent or can be distinguished from one another by other criteria.

The transmitter 16 illustrated in FIG. 2 therefore has the important advantages that it is suitable and designed such that the transmission of data only in one direction is possible at any time, but transmission of data in the opposite direction is also prevented. The advantage that the networks 12 and 13 or their network devices 14, 16 "see" a transmitter 16 that corresponds to a conventional transmitter (in particular router) without any security mechanism should also be mentioned. As a result, the transmitter 16 can be used universally at those locations between networks that use bidirectional transmission protocols without errors occurring in the network traffic (data exchange) inside the two networks as a result of the unidirectional transmission path between the networks when using these network protocols. At the same time, however, this effectively ensures on account of the method according to the invention that only unidirectional data transmission on the one hand, and provides universal use on the other hand.

The invention claimed is:

1. A method of operating a network system including:
   a first network having a first network device,
   a transmitter having a first input router with a first address, a second output router, and a diode, and
   a second network having a second network device with a second address,
the method comprising the steps of sequentially:
   a) the first network device transmitting a first request to the transmitter;
   b) the transmitter answering the first request to the first network device with the first address of the first router;
   c) the first network device transmitting data to the first router using the first address;
   d) the first router transmitting the data through the diode to the second router using an address of the second router that is stored in the first router while the diode blocks any transmission of data from the second router to the first router;
   e) the transmitter transmitting a second request to the second network device;
   f) the second network device answering the second request to the transmitter with the second address; and
   g) the second router transmitting the data to the second network device using the second address.

2. The method according to claim 1, wherein the diode is a physical element that blocks all communication from the second router to the first router.

3. In a network system including:
   a physical diode through which the data is transmitted between the routers only in one direction,
   a first network having a first network device,
   a transmitter having a second network device with a second address, the system operating by the steps of sequentially:
   the first network device transmitting a first request to the transmitter,
   the transmitter answering the first request to the first network device with the first address of the first router,
   the first network device transmitting data to the first router using the first address,
   the first router transmitting the data through the diode to the second router using an address of the second router that is stored in the first router while the diode blocks any transmission of data from the second router to the first router,
   the transmitter transmitting a second request to the second network device,
   the second network device answering the second request to the transmitter with the second address, and
   the second router transmitting the data to the second network device using the second address.

4. The network system according to claim 3, wherein the two routers are integrated in one device.

\* \* \* \* \*